(12) United States Patent
Miller

(10) Patent No.: US 9,004,238 B2
(45) Date of Patent: Apr. 14, 2015

(54) DISC BRAKE OF HYDRAULIC SELF-ENERGIZING DESIGN WITH ADJUSTING DEVICE

(71) Applicant: Knorr-Bremse Systeme fuer Nutzfahrzeuge GmbH, Munich (DE)

(72) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 134 days.

(21) Appl. No.: 13/713,791

(22) Filed: Dec. 13, 2012

(65) Prior Publication Data

US 2013/0098716 A1 Apr. 25, 2013

Related U.S. Application Data

(63) Continuation of application No. PCT/EP2011/059822, filed on Jun. 14, 2011.

(30) Foreign Application Priority Data

Jun. 17, 2010 (DE) .......................... 10 2010 024 076

(51) Int. Cl.
*F16D 55/08* (2006.01)
*F16D 65/56* (2006.01)
(Continued)

(52) U.S. Cl.
CPC .............. *F16D 65/567* (2013.01); *F16D 65/18* (2013.01); *F16D 65/568* (2013.01); *B60T 1/065* (2013.01);
(Continued)

(58) Field of Classification Search
CPC ....... F16D 65/72; F16D 65/74; F16D 65/183; F16D 65/567; F16D 65/568; F16D 2127/10; B60T 1/065

USPC ............... 788/71.9, 72.2, 72.7–72.9, 370; 188/71.9, 72.2, 72.7–72.9, 370
See application file for complete search history.

(56) References Cited

U.S. PATENT DOCUMENTS 6,397,977 B1 * 6/2002 Ward ......................... 188/1.11 L
7,258,206 B2 * 8/2007 Severinsson ................. 188/72.7
(Continued)

FOREIGN PATENT DOCUMENTS

DE           0784162 B1 *  7/1997  ............. F16D 66/02
DE  10 2006 057 442 A1   6/2008
(Continued)

OTHER PUBLICATIONS

International Preliminary Report on Patentability (PCT/IB/338 & PCT/IB/373), including Written Opinion (PCT/ISA/237) dated Jan. 3, 2013 (seven (7) pages).
(Continued)

*Primary Examiner* — Thomas Irvin
(74) *Attorney, Agent, or Firm* — Crowell & Moring LLP

(57) ABSTRACT

A self-energizing disc brake includes a brake-internal hydraulic arrangement with a supply circuit and an expansion vessel, a brake application device with a brake application cylinder for applying a brake pad in the direction of a brake disc, a force transmission unit which supports the brake pad at a wedge angle on the brake application device, a tangential-force absorbing cylinder for switching over the wedge angle and being operatively connected to the force transmission unit; an electric-motor actuator which acts on the brake application device via the hydraulic arrangement, a distributor cylinder arranged in series between the electric-motor actuator and the brake application device for pressure boosting, and a control unit for controlling switchover of the wedge angle between the tangential-force absorbing cylinder and the electric-motor actuator. An adjusting device adjusts brake pad wear, and has a movable screw spindle, which is operatively connected to the brake application device.

12 Claims, 6 Drawing Sheets

(51) Int. Cl.
*F16D 65/18* (2006.01)
*B60T 1/06* (2006.01)
*F16D 121/02* (2012.01)
*F16D 121/24* (2012.01)
*F16D 125/06* (2012.01)
*F16D 125/64* (2012.01)
*F16D 127/10* (2012.01)

(52) U.S. Cl.
CPC ......... *F16D 2121/02* (2013.01); *F16D 2121/24* (2013.01); *F16D 2125/06* (2013.01); *F16D 2125/64* (2013.01); *F16D 2125/645* (2013.01); *F16D 2127/10* (2013.01)

(56) References Cited

U.S. PATENT DOCUMENTS

| | | | |
|---|---|---|---|
| 7,497,306 B2 * | 3/2009 | Severinsson | 188/72.2 |
| 7,946,397 B2 | 5/2011 | Miller | |
| 7,980,366 B2 * | 7/2011 | Pericevic et al. | 188/72.4 |
| 2005/0067233 A1 * | 3/2005 | Nilsson et al. | 188/158 |
| 2008/0257660 A1 * | 10/2008 | Miller | 188/72.1 |
| 2013/0098715 A1 * | 4/2013 | Miller | 188/71.9 |
| 2013/0112512 A1 * | 5/2013 | Miller | 188/72.4 |

FOREIGN PATENT DOCUMENTS

| | | |
|---|---|---|
| DE | 10 2008 061 347 B3 | 4/2010 |
| WO | WO 2007/045430 A1 | 4/2007 |

OTHER PUBLICATIONS

International Search Report dated Sep. 15, 2011 including English-language translation (four (4) pages).

* cited by examiner

DISC BRAKE OF HYDRAULIC SELF-ENERGIZING DESIGN WITH ADJUSTING DEVICE

CROSS-REFERENCE TO RELATED APPLICATIONS

This application is a continuation of PCT International Application No. PCT/EP2011/059822, filed Jun. 14, 2011, which claims priority under 35 U.S.C. §119 from German Patent Application No. DE 10 2010 024 076.1, filed Jun. 17, 2010, the entire disclosures of which are herein expressly incorporated by reference.

This application contains subject matter related to U.S. application Ser. No. 13/713,273, entitled "Disc Brake of Hydraulic Self-Energizing Design With Parking Brake Device," and application Ser. No. 13/713,780, entitled "Disc Brake of Hydraulic Self-Energizing Design With Force Transmission Unit," both filed on even date herewith.

BACKGROUND AND SUMMARY OF THE INVENTION

The invention relates to a disc brake of hydraulic self-energizing design with a readjustment device.

A disc brake with an electromotive actuator of self-energizing design and with a brake-internal hydraulic arrangement is described in the applicant's application WO 2007/045430 A1.

A readjustment device of a disc brake of the type is composed of a relatively large number of parts.

It is the object of the present invention to improve a readjustment device of a generic disc brake.

It is thereby possible to realize a wear-compensating readjustment which permits the construction of a compact disc brake with a smaller number of parts than in the prior art.

According to the invention, the disc brake is provided with a readjustment device for readjustment to compensate brake pad wear, wherein the readjustment device has an adjustable screw spindle which serves, in operative connection with the brake-application device, for generating a follow-up movement of the at least one brake pad. Here, the screw spindle is integrated in a particularly space-saving manner into the at least one brake-application cylinder. The screw spindle can furthermore be coupled to the electromotive actuator in order to be driven, and has a readjustment piston which can be hydraulically adjusted in the tangential force absorption cylinder during a follow-up movement of the at least one brake pad.

Functional reliability of wedge angle switching and pressure boosting is thus also permitted in a simple manner.

A disc brake of self-energizing construction comprises the following: a brake-internal hydraulic arrangement with a reservoir circuit and an expansion vessel; a brake-application device having at least one brake-application cylinder for the brake-application movement of at least one brake pad in the direction of a brake disc; at least one force transmission unit which supports the at least one brake pad on the brake-application device at a wedge angle; at least one tangential force absorption cylinder for wedge angle switching, which tangential force absorption cylinder is operatively connected to the at least one force transmission unit; an electromotive actuator which acts on the brake-application device via the hydraulic arrangement; a distributor cylinder for pressure boosting, which distributor cylinder is arranged in series between the electromotive actuator and the brake-application device; and a control unit which is provided for controlling the wedge angle switching between the tangential force absorption cylinder and the electromotive actuator, wherein the disc brake comprises a readjustment device for readjustment to compensate brake pad wear, wherein the readjustment device has an adjustable screw spindle, which is operatively connected to the brake-application device for the purpose of generating a follow-up movement of the at least one brake pad and can be coupled to the electromotive actuator in order to be driven, and a readjustment piston, which can be hydraulically adjusted in the tangential force absorption cylinder during a follow-up movement of the at least one brake pad.

It is thus possible, likewise in a space-saving manner, for a readjustment drive wheel with a shaft drive wheel coupled to the screw spindle to be designed as a hydraulic gear motor, which can be hydraulically coupled to the electromotive actuator by way of a hydraulic switch. The hydraulic switch can preferably be controlled by the control unit.

A great advantage is that the drive of the readjustment device is realized hydraulically. The gear motor can be of flat construction, and the hydraulic lines can be integrated into the housing.

It can also be made possible in this way for the readjustment piston to be connectable, for a follow-up movement, to the reservoir circuit by way of a directional valve.

In a preferred embodiment, it is provided that the expansion vessel of the reservoir circuit of the brake-internal hydraulic arrangement is equipped with a sensor for detecting pad wear, wherein the sensor is connected to a brake control unit which, for the activation of the readjustment device for a corresponding follow-up movement of the at least one brake pad, is coupled at least to the electromotive actuator and to the control unit. A brake control unit of this type is provided in a brake of this type in any case, and can be upgraded with corresponding software in a simple manner. An auxiliary unit may self-evidently also be provided. The sensor for the liquid level in the expansion vessel may thus be used as a travel sensor for measurement of the horizontal adjustment of the brake pads, detection of hydraulic fluid losses, and determination of the brake pad wear status. Instead of a travel sensor, use may also be made, as an inexpensive alternative, of a pressure sensor to detect the present oil quantity in the expansion vessel.

In a preferred embodiment, the control unit may have a control disc which can be driven hydraulically, by way of a control drive in the form of a hydraulic gear motor, by the electromotive actuator via a switching valve. It is possible in this way, by way of simple control means, for the electromotive actuator to be used as a drive for different tasks. In this case, the electromotive actuator, in addition to its function as a pressure generator for the brake-application device, acts as a drive source for the readjustment device and the control device.

The readjustment device may be provided with an emergency release device, which is preferably coupled to the readjustment drive wheel. In this way, not only is a manual release of the brake possible in the event of an emergency, but a resetting of the brake-application device is also possible for example in the event of a pad change.

The follow-up movement of the brake pads in the event of wear may take place after a certain number of braking operations. In the simplest case, the readjustment takes place at the end of every actuation of the parking brake, because here, the air play between the mechanical abutment of the screw spindle wheel against the cylinder base and the contact point of the brake pads with the disc must be newly set in any case.

In normal, unbraked driving operation for an intelligent follow-up movement in the event of wear of the brake pads (and also of the brake disc), it is alternatively possible for the readjustment device to be equipped with at least one sensor. The sensor may detect a readjustment travel in order to determine a present follow-up movement, and transmit the readjustment travel to the brake control unit for the regulation of the readjustment device. The brake control unit can, in a conventional manner, compare the present travel with a comparison value stored for example in a table, and thus always set the brake pad with its required air play.

For this purpose, the sensor for determining a readjustment travel may be a multi-turn potentiometer which is directly or indirectly coupled to the screw spindle. Such angle sensors are available in a variety of embodiments for numerous purposes and in high quality, even for high temperatures such as may arise in a brake.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
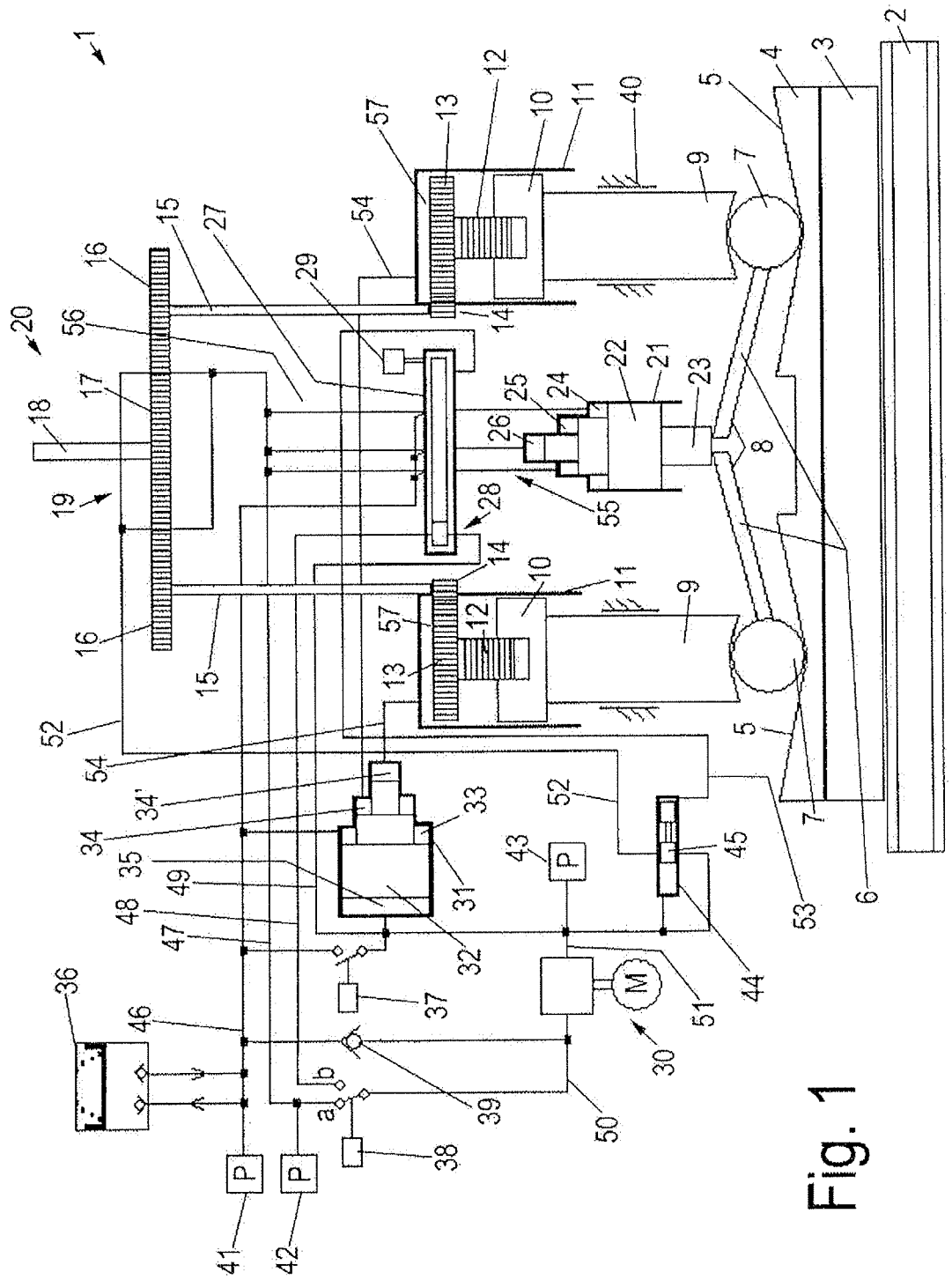
FIG. 1 is a schematic illustration of a first exemplary embodiment of a disc brake according to the invention.

Components of identical or similar function are denoted by the same reference numerals unless stated otherwise.

Here, the expression "oil" refers to hydraulic fluid.

Figure 2:
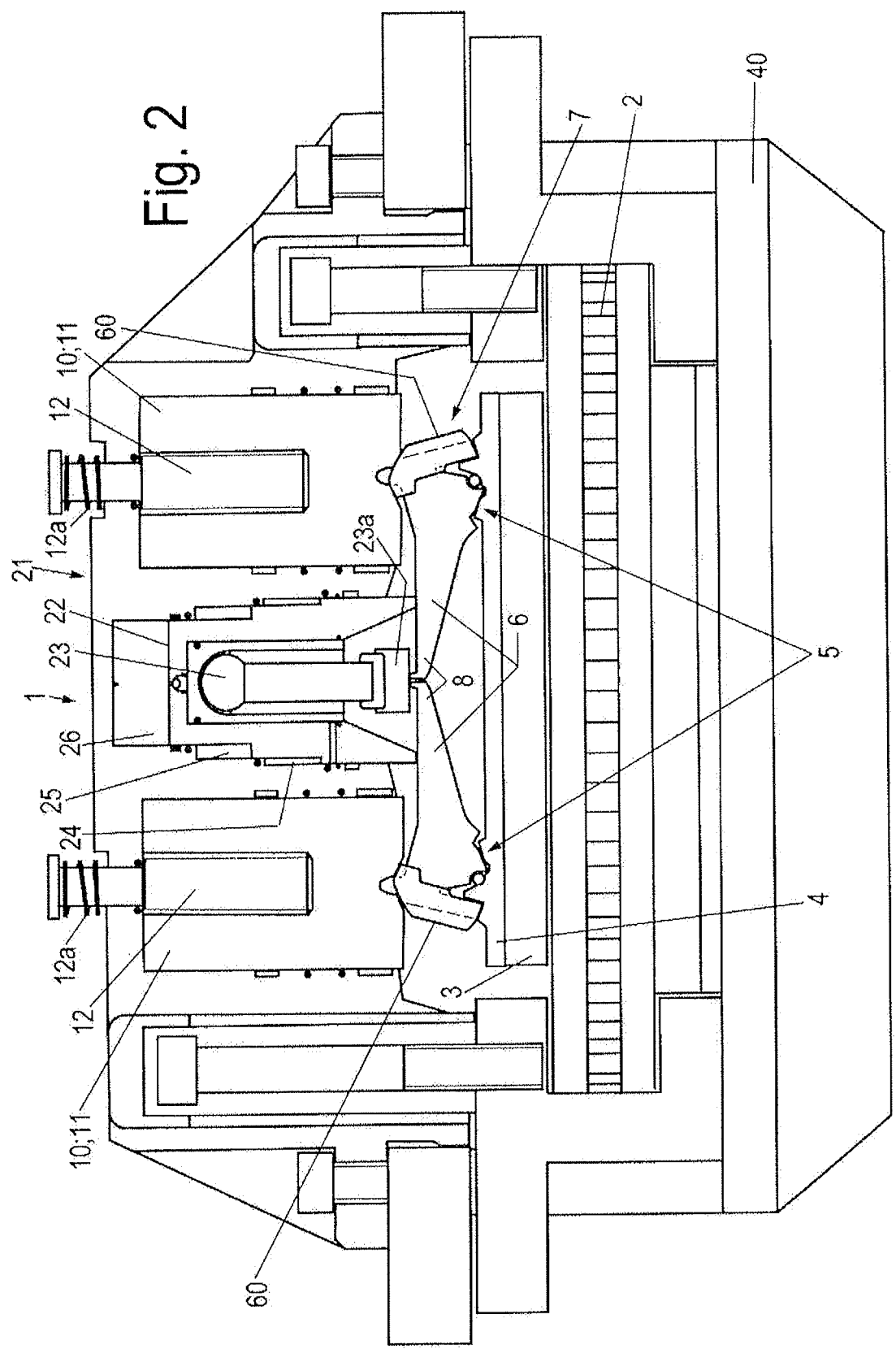
FIG. 2 is a schematic, partially sectional illustration of a second exemplary embodiment of the disc brake according to the invention in a normal position.
Figure 3:
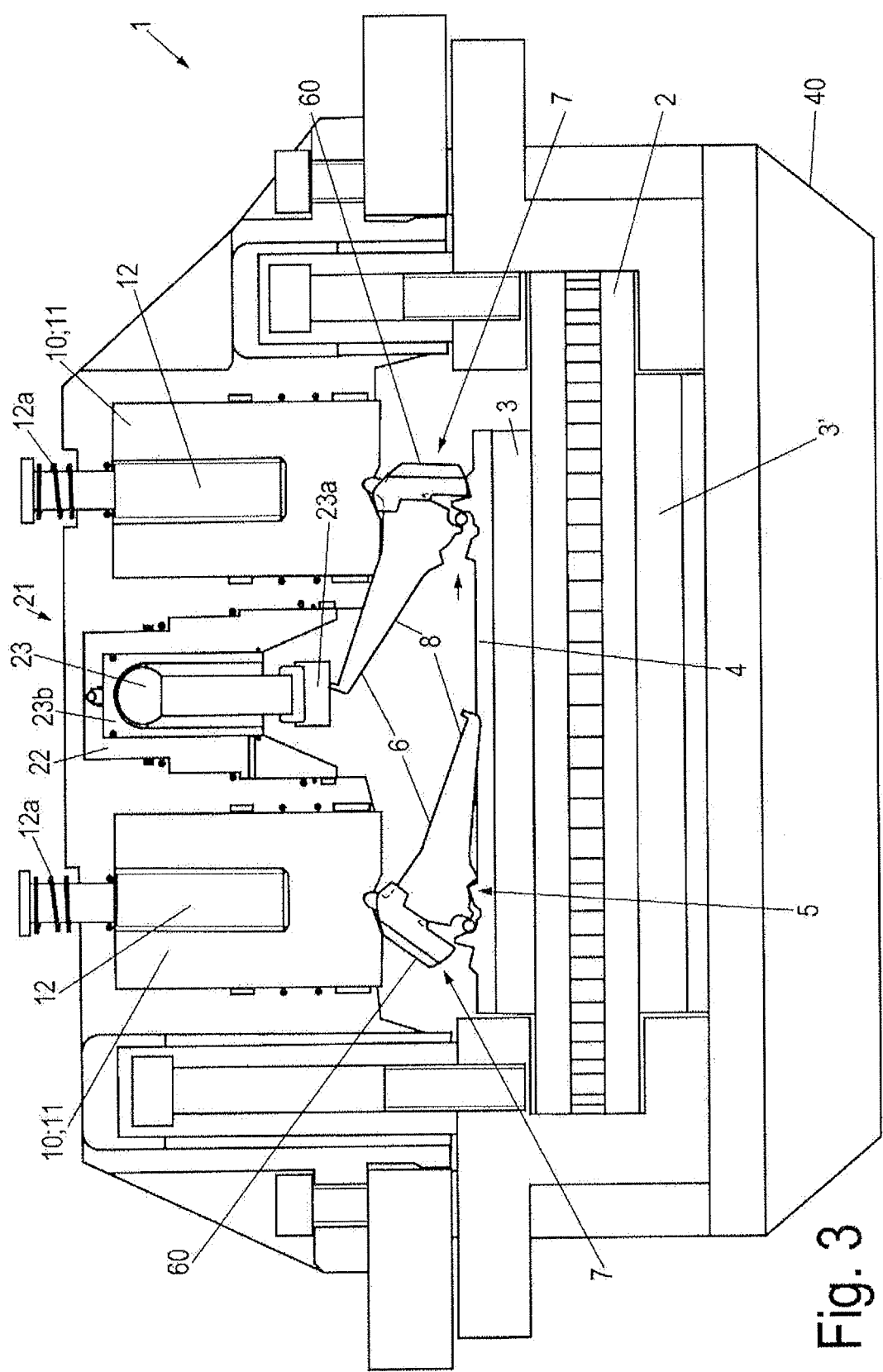
FIG. 3 is a schematic, partially sectional illustration of the second exemplary embodiment as per FIG. 2 in a position of maximum brake application.

FIG. 1 is a schematic illustration of a first exemplary embodiment of a disc brake 1 according to the invention. FIG. 1 will be described in conjunction with FIG. 2 and FIG. 3. FIG. 2 is a schematic, partially sectional illustration of a second exemplary embodiment of the disc brake according to the invention in a normal position, and FIG. 3 is a schematic, partially sectional illustration of the second exemplary embodiment as per FIG. 2 in a position of maximum brake application.

The disc brake 1 has a brake caliper 40 which engages over a brake disc 2. At both sides of the brake disc 2 there is arranged in each case one brake pad 3, 3' with brake pad carrier 4, wherein the brake pad 3' shown at the bottom in FIG. 2 (and not illustrated in FIG. 1) bears against the brake caliper 40, and the other brake pad 3 is operatively connected to a brake-application device. The axis of the brake disc 2 is not shown and runs, as is easily conceivable, vertically upward below the plane of the drawing. A forward movement of a vehicle to which the disc brake 1 is assigned is intended to run from right to left in FIGS. 1 to 3, wherein the brake disc 2 then rotates counterclockwise.

Here, the pad carrier 4 is formed with two wedge-shaped support devices 5, wherein the support devices are supported at a wedge angle on the brake-application device, with which the support devices are operatively connected in each case by a force transmission unit 7 to in each case one brake-application element 9. The brake-application elements 9 are connected at their top end in each case to a brake-application piston 10 of a brake-application cylinder 11. The brake-application cylinders 11 are arranged adjacent to one another such that the brake pads 3, 3' can be pressed uniformly against the brake disc 2 during a brake application.

A screw spindle 12 with a thread is screwed into the brake-application piston 10 in each case in the longitudinal direction. The screw spindles 12 are each provided, on the top ends thereof, with a screw spindle wheel 13, wherein each screw spindle wheel 13 engages with a readjustment pinion 14. The readjustment pinions 14 are in each case rotationally conjointly connected by way of readjustment shafts 15 to readjustment shaft wheels 16, which jointly engage with a readjustment drive wheel 17. The readjustment drive wheel 17 is formed, for example, as a hydraulically operated gear motor 19, and in this case are equipped with an emergency release device 18 which can be adjusted for example by use of a tool in order to actuate the readjustment drive wheel 17. The readjustment wheels 13, 14, 16 and 17 have toothings, for example, and are used for wear-compensating readjustment of the brake pads 3, 3', as will be explained in more detail further below. The readjustment wheels 13, 14, 16 and 17, the emergency release device 18, the readjustment shafts 15 and the gear motor 19 form, together with the screw spindles 12, a readjustment device 20 of the disc brake 1.

Return springs 12a are arranged in each case between the brake caliper 40 and screw spindles 12 in the longitudinal direction of the screw spindles 12 and, in the normal position shown in FIG. 2, pull the brake pad 3, 3' back away from the brake disc 2 to generate a certain so-called air play. Further springs (not illustrated) are provided for holding the brake-application piston 10 and brake pad 3 together.

The force transmission units 7 have in each case a diverting lever 6, wherein the diverting levers 6 are situated opposite one another and thrust portions 8 are operatively connected to a plunger 23 of a tangential force absorption cylinder 21. Here, the plunger 23 is part of a stepped absorption piston 22 which, together with the tangential force absorption cylinder 21, defines first to third pressure chambers 24, 25 and 26.

The pressure chambers 24, 25 and 26 are connected in each case via intermediate lines 55 to a control unit 27, which is a constituent part of a hydraulic system of the disc brake 1. The hydraulic system will now be explained in more detail on the basis of FIG. 1.

An electromotive actuator 30, for example an electric motor with a gearwheel pump, is connected to a reservoir circuit 46 via a pump suction line 50 with a suction valve 39, for example a directional valve. The reservoir circuit 46 is hydraulically connected at one side to an expansion vessel 36 and to a first pressure sensor 41. At the other side, the reservoir circuit 46 can be connected by way of a release valve 37 to a pump pressure line 51 of the electromotive actuator 30. Furthermore, the reservoir circuit 46 is connected to the control unit 27 and to an admission pressure chamber 33 of a distributor cylinder 31.

The reservoir circuit 46 is, for example, charged with a reservoir pressure of approximately 1 to 4 bar. A pressure sensor 41 measures the travel-dependent change in pressure owing to the spring stiffness of a compression spring mounted above a piston. Here, the piston should exhibit low sliding and static friction. By detecting the travel-direction-dependent pressure signal hysteresis, the sliding friction can be detected and substantially compensated by way of evaluation software in the control unit.

The electromotive actuator 30 is furthermore connected via the pump pressure line 51 to an inlet pressure chamber 35 of the distributor cylinder 31 and to a hydraulic switch 44. Also connected to the pump pressure line 51 is a control drive pressure line 49 which leads to a control drive 28 of the control unit 27. A control drive return line 48 is connected between the control drive 28 and a position b of a switching valve 38. Here, a closed position a of the switching valve 38 connects the pump suction line 50 to an intermediate circuit 47 which is connected firstly to the control unit 27 via connecting lines 56. Furthermore, the intermediate circuit 47 is connected to the gear motor 19 of the readjustment device 20, wherein a gear motor pressure line 52 connects the gear motor 19 at the pressure side to the hydraulic switch 44. The hydraulic switch 44 is furthermore connected via a hydraulic switch control line 53 to the control unit 27.

The control unit 27 is, for example, a plate-like, rotatable control disc with control bores which perform different functions of the disc brake 1 in different operating states and perform control tasks. The control disc is for example coupled to a hydraulic gear motor as control drive 28. The control disc is also operatively connected to a control transmitter 29. A superordinate, for example electronic brake control unit (not shown) controls and regulates the braking processes and states of the disc brake 1. For this purpose, the brake control unit controls the valves 37 and 38, which are for example electromagnetic valves, and the electromotive actuator 30. The control unit also communicates with the first pressure sensor 41 and with further pressure sensors, of which a second pressure sensor 42 determines a pressure in the intermediate circuit 46. A third pressure sensor 43 serves for determining a pressure in the pump pressure line 51, wherein the pressure may be up to 130 bar.

The distributor cylinder 31 has a stepped piston 32 for pressure boosting, synchronization and uniform loading of the brake-application cylinder 11 with a brake-application pressure of up to approximately 250 bar. For this purpose, the stepped piston 32 forms, together with the brake-application cylinder 11, high-pressure chambers 34, 34', which are connected in each case via a high-pressure line 54 to the brake-application cylinders 11.

The disc brake 1 is a hydraulic, self-energizing disc brake, the function of which will now be explained.

Upon the start of a braking operation, hydraulic fluid is sucked out of the reservoir circuit 46 and out of the expansion vessel 36 via the suction valve 39 by way of the electromotive actuator 30. Here, the electromotive actuator 30 increases the pressure in the pump pressure line 51, as a result of which the stepped piston 32 of the distributor cylinder 31 is adjusted and the brake-application cylinder 11 is charged with pressure. The brake pads 3, 3' are thus pressed against the brake disc 2 until a self-energizing process is initiated.

Here, the brake pad 3 is displaced to the left in FIG. 3, against a stop of the brake caliper 40, owing to friction. The left-hand force transmission unit 7, as diverting lever 6, is pivoted downward, and the right-hand force transmission unit 7, as further diverting lever 6, is pivoted upward. The diverting levers 6 are pivoted by the tangential force thus generated. The right-hand diverting lever 6 diverts the tangential force into a vertical force which is transmitted, via the thrust portion 8 of the diverting lever, to the plunger 23 of the tangential force absorption cylinder 21. Here, a thrust plate 23a serves for a uniform and low-friction transmission of force. Further braking forces are introduced into the brake caliper 40 by way of the brake-application cylinders 11 via the force transmission unit 7, in this case that on the right-hand side. On the left-hand side, the diverting lever 6, by way of its portion arranged between the brake-application element 9 and the support device 5, transmits the brake-application force of the left-hand brake-application cylinder 11. On the right-hand side, the transmission of the brake-application force of the right-hand brake-application cylinder 11 is performed by a shoulder element 60 of the right-hand force transmission unit 7. If the vehicle (not shown) travels backward, the above-described process is reversed, as is easily comprehensible, and the left-hand diverting lever 6 transmits the tangential force to the tangential force absorption cylinder 21.

When the distributor piston 32 is in the rest position (at the left-hand stop in the drawing), the two high-pressure chambers 34, 34' are connected to the admission pressure chamber 33. In this way, the two brake-application pistons 10 can be hydraulically newly balanced in their rest position (pulled back against the stop). At the same time, this serves to return excess oil from the brake-application cylinders 11 during the pad change, when the brake-application pistons 10 are fully retracted again.

Here, the control disc of the control unit 27 is set by way of the control drive 28 such that the pressure chambers 24, 25 and 26 of the tangential force absorption cylinder 21 can be connected in seven different combinations either to the reservoir circuit 46 and/or to the intermediate circuit 47, which is connected by way of the switching valve 38 to the pump suction line 50. It is thus possible for the disc brake 1 to be adapted to a present friction coefficient. Different so-called wedge angles can be set. Measurement values for the determination of the present friction coefficient are provided by the pressure sensors 41, 42, 43 and further parameters, for example from a vehicle controller. The tangential force absorption cylinder 21 thus delivers a pressure which, to boost the pressure in the pump pressure line 50, acts on the brake-application cylinder 11 via the distributor cylinder 31 and reduces the pumping power of the electromotive actuator 30. The distributor cylinder 31 may, together with the two brake-application cylinders 11, synchronize the brake-application movement thereof, compensate oblique wear of the brake pads 3, 3', and lower a pressure level between the tangential absorption cylinder 21 and the distributor cylinder 31 in the intermediate circuit 46. Here, the distributor cylinder 31 serves as a pressure booster for the brake-application cylinder 11.

At the end of the braking process, the electromotive actuator 30 is deactivated, and the release valve 37 is activated. As a result, the pressure in the pump pressure line 51 is dissipated, wherein with falling brake-application pressure in the brake-application cylinders 11, the return springs 12a return the brake pad 3 again into its normal position with air play.

The release valve 37 may also be used, in the event of a fault, as an emergency release valve for releasing the disc brake 1. The release valve is for example a magnetic valve which is open in the deenergized state.

The expansion vessel 36 furthermore serves for receiving the volumes of the pressure chambers 24, 25, 26, which are connected to the reservoir circuit 46 by way of the control unit 27, of the tangential force absorption cylinder 21. The expansion vessel 36 also has sensors for determining hydraulic fluid losses. The pad wear of the brake pads 3, 3' can also be measured in this way.

In the event of wear being detected in this way, at a certain wear value, the switching valve 38 is switched by the brake control unit into position b, and the electromotive actuator 30 is activated. Here, the control drive return line 48 is connected to the pump suction line 50, and the hydraulic gear motor 28 of the control unit 27 adjusts the control disc such that, via the hydraulic switch control line 53, a slide 45 of the hydraulic switch 44 is displaced into an open position, for example by the pressure, acting on the hydraulic switch, of the pump pressure line 51 connected to the hydraulic switch. The open position of the slide 45 then connects the pump pressure line 51 to the gear motor pressure line 52 and exerts the pressure on the gear motor 19 of the readjustment device 20. The readjustment drive wheel 17 thus rotates the screw spindles 12 via the gearwheels 16, 14, 13, whereby the brake-application elements 9 of the brake-application cylinders 11 are adjusted in the direction of the brake disc 2 and readjust the determined wear travel of the brake pad 3 or 3' until the air play of the normal state is re-established. Various sensors, for example angle sensors on the gear motor 19, may serve for the precise measurement of the readjustment travel. The sensor may for example be a multi-turn potentiometer, the electrical resistance of which varies proportionally with respect to the readjustment travel over a rotational angle which is proportional to the readjustment travel, and thus provides a measure for the readjustment travel.

The readjustment process is ended, when the normal air play is reached, in that, by way of the switching valve 38, the control drive 28 is actuated for the deactivation of the hydraulic switch 44 via the hydraulic switch control line 53, as a result of which the gear motor 19 is deactivated, and then the electromotive actuator 30 is deactivated.

Figure 4:
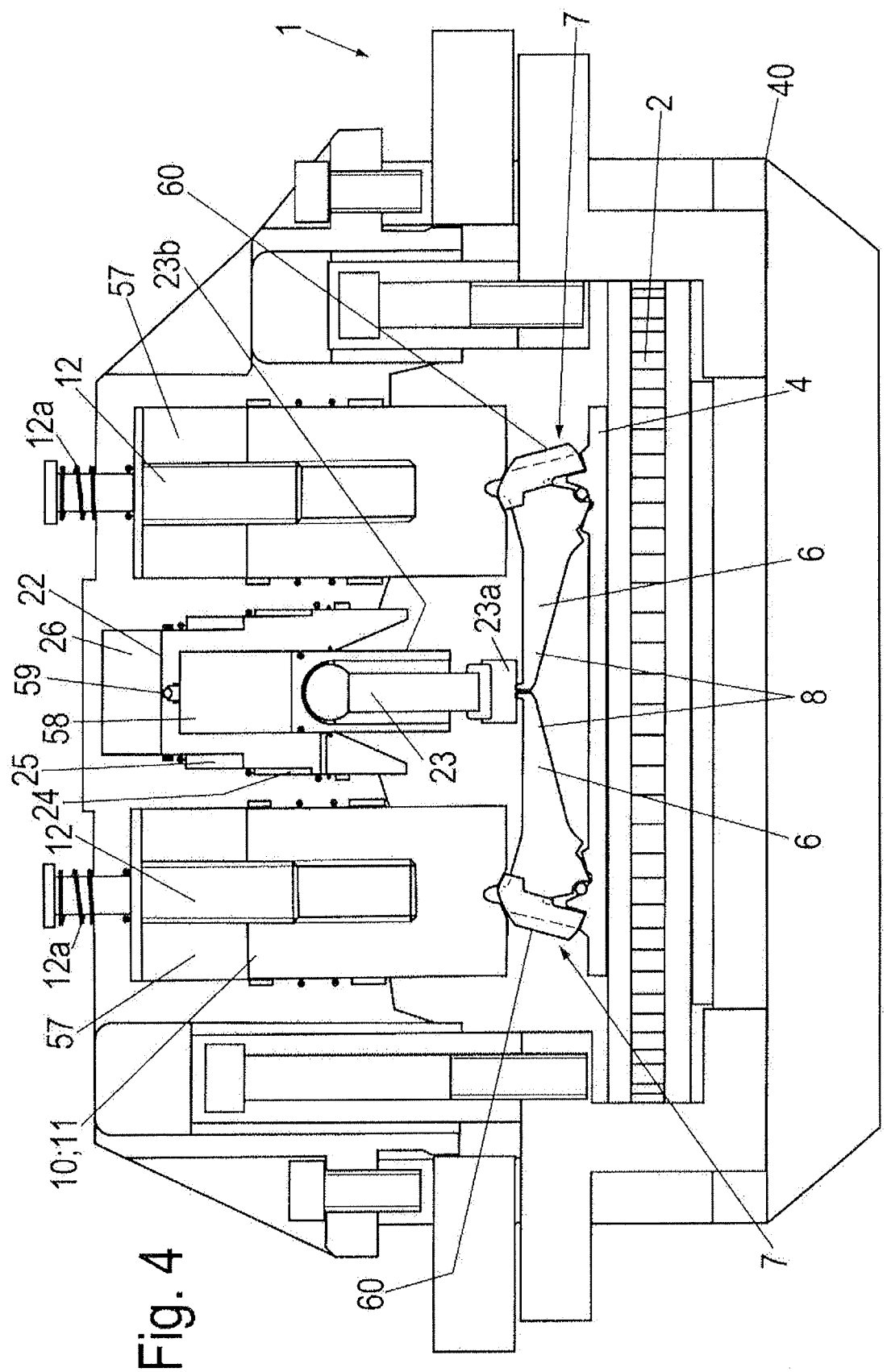
FIG. 4 is a schematic, partially sectional illustration of the second exemplary embodiment as per FIG. 2 in a normal position with maximum brake wear.

FIG. 4 is a schematic, partially sectional illustration of the second exemplary embodiment as per FIG. 2 in a normal position with maximum brake wear of the brake pads 3, 3'. It can be clearly seen that the brake-application pistons 10 have been adjusted in the brake-application cylinders 11 downward in the direction of the brake disc 2 by the screwed-out screw spindles 12. Here, brake-application pressure chambers 57 of the brake-application cylinders 11 are subsequently filled with hydraulic fluid in order to compensate the readjustment travel. This may take place by use of the reservoir circuit 46. Furthermore, the wear-compensating readjustment of the brake pad 3 has the result that the diverting levers 6 are likewise adjusted, with their thrust portions 8, by the readjustment travel. Without compensation of the readjustment travel, a function of the tangential force absorption cylinder 21 would not be possible over the entire readjustment travel. For this purpose, the stepped absorption piston 22 of the tangential force absorption cylinder 21 is provided with a readjustment piston 23b, which is arranged, between the plunger 23 and the stepped absorption piston 22, in the stepped absorption piston so as to be displaceable coaxially with respect thereto. The readjustment piston 23b is situated in the stepped absorption piston 22 and forms with the latter a readjustment chamber 58, which communicates via a directional valve 59 with the third pressure chamber 26 of the tangential force absorption cylinder 21.

The readjustment of the readjustment piston 23b likewise takes place by use of the reservoir circuit 46, in that the pressure chambers 24 to 26 are filled from the reservoir circuit 46 by way of the control unit 27. Here, the readjustment chamber 58 is also filled via the directional valve 59. The pressure in the reservoir circuit 46 must be adequate for this purpose. The pressure may, however, also be increased by way of additional pressure-increasing measures by use of the electromotive actuator 30 using additional valves and regulating means, wherein the readjustment travel of the readjustment piston 23b may be detected by use of suitable sensors. If force is now introduced into the readjustment piston 23b via the plunger 23 during a braking process, the hydraulic fluid in the readjustment chamber 58 cannot escape owing to the directional valve 59. In the event of a pad change and resetting of the readjustment device 20, the readjustment chamber 58 is likewise evacuated, which may be realized for example by opening the directional valve 59 or by way of a pin positioned centrally in the base of the pressure chamber 26. This will be explained below.

A readjustment of the pad wear takes place in each case after the release of the immobilizing brake or parking brake. The working chamber of the cylinder of the stepped absorption piston 22, that is to say the pressure chambers 24, 25 and 26, permits a slightly greater movement travel than the diverting levers 6 require at their maximum deflection.

The readjustment pistons 23b can thus adjust themselves automatically. To deploy the piston 23b, additional oil is admitted through the directional valve 59 as backflow preventer into the cylinder chamber (readjustment chamber 58) above the readjustment piston 23b. This occurs when, by way of spindles 12, the brake-application pistons 10 have been adjusted further in the direction of the brake disc 2 (owing to pad wear) after the end of the parking brake or handbrake actuation. The stepped absorption piston 22 thereby abuts against its outer movement stop. The hydraulic pressure in the readjustment piston 23b, that is to say in the readjustment chamber 58, falls, such that the directional valve 59 opens and oil flows into the readjustment chamber 58.

The reversed retraction of the readjustment piston 23b takes place during an exchange of the brake pads 3, 3' and/or of the brake disc 2. For this purpose, the spindles 12 are hydraulically actuated by the gear motor 19 such that the brake-application pistons 10 are retracted. The stepped absorption piston 22 is thereby also retracted. The hydraulic oil above the brake-application pistons 10 and above the stepped absorption piston 22 is forced into the expansion vessel 36. Here, the stepped absorption piston 22 is retracted until the piston base surface thereof makes contact with the cylinder chamber base of the third pressure chamber 26. Shortly before the contact point, a pin (not illustrated but easily conceivable) which is positioned centrally in the base of the third pressure chamber 26 presses against the directional valve 59, such that the latter opens and the oil situated in the readjustment chamber 58 is forced via the third pressure chamber 26 into the expansion vessel 36. Position regulation for the stepped absorption piston 22 is thus realized in a simple manner, such that the stepped absorption piston, despite occasional pad wear-compensating readjustment, can follow the movement profile of the diverting lever 6 without being hindered by its mechanical stops.

Figure 5:
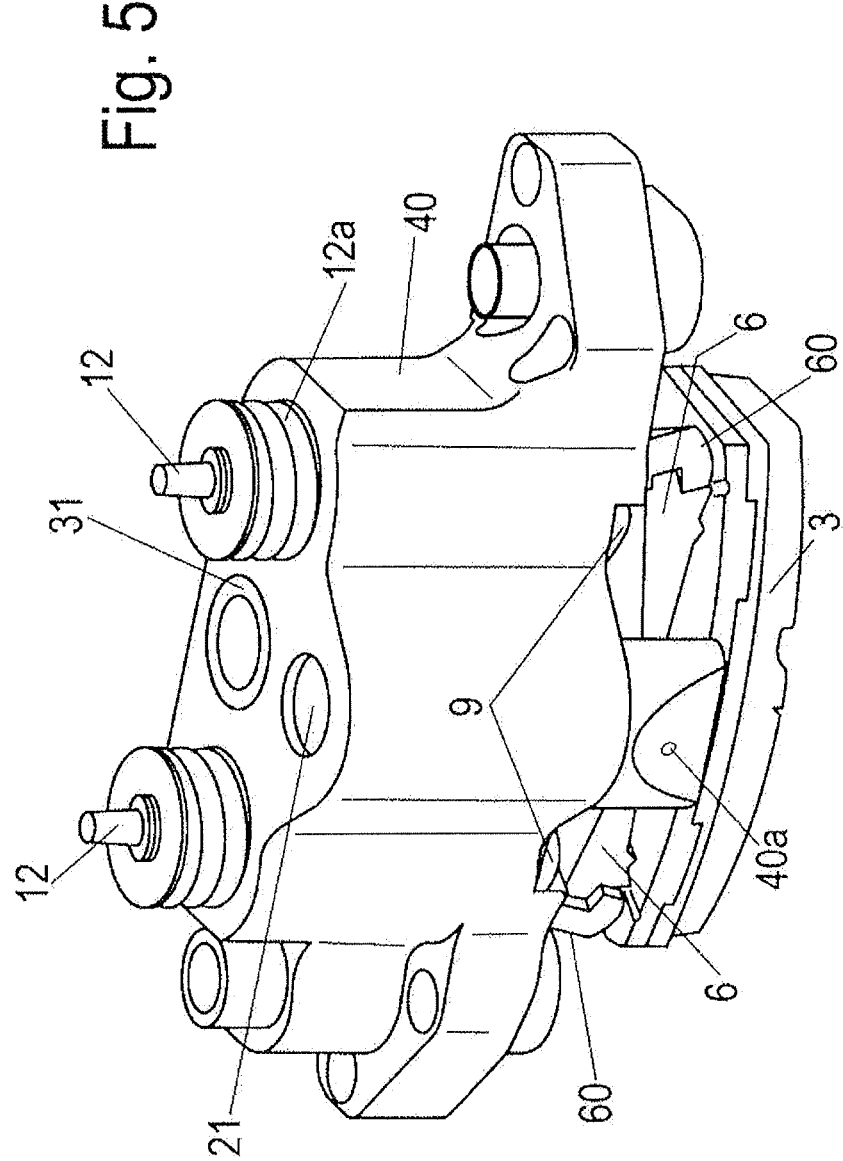
FIG. 5 shows a schematic, perspective view of the second exemplary embodiment as per FIG. 2.
Figure 6:
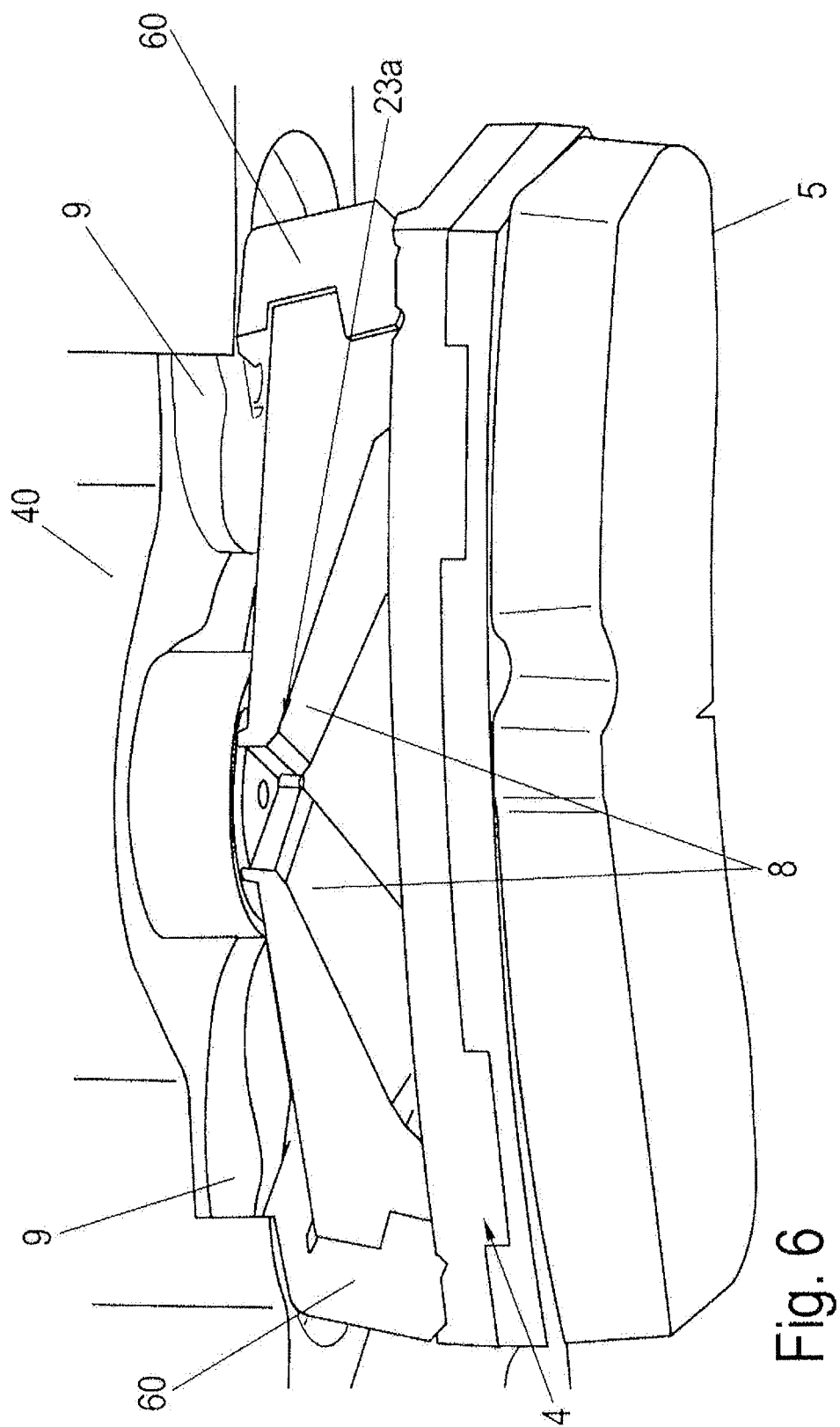
FIG. 6 shows a schematic, perspective view of a detail from FIG. 5.

FIG. 5 shows a schematic perspective view of the second exemplary embodiment as per FIG. 2, and FIG. 6 shows a schematic perspective view of a detail from FIG. 5.

FIG. 5 shows a portion of a brake caliper 40 in which, in this case, all of the hydraulic components are arranged. Between the brake-application cylinders 11, of which in this case the upper ends of the screw spindles 12 with the return springs 12a are visible, the tangential force absorption cylinder 21 and the distributor cylinder 31 are arranged one behind the other, wherein the cylinders 11, 21 and 13 are substantially all situated parallel to one another. In the lower region, illustrated from another perspective in FIG. 6, a stop element 40a is arranged, between the brake caliper 40 and pad carrier 4, below the tangential force absorption cylinder 21. Adjacent to the stop element 40a, there may also be positioned on the inner side a spring for holding the brake-application piston 10 and brake pad 3 together. The brake pad 3 is of circular-arc-shaped form corresponding to the brake disc 2, wherein the diverting levers 6 with the shoulder elements 60 are arranged between piston elements 9 and the support device 5, and the thrust portions 8 point radially outward and bear against the thrust plate 23a.

The disc brake 1 according to the invention thus has the following characteristics and advantages:

High energy density and force density (180 kN brake-application force can be realized in the structural space);
Automatic self-energization in both directions of travel
Automatic and reliable emergency release function as a result of a normally-open magnetic valve (release valve 37);
Electromotive drive;
Hydraulic force transmission by use of brake or hydraulic fluid;
Hydraulic components are a reliable and known standard technology;
Shorter braking travel as a result of improved ABS regulation (small masses to be accelerated);
Short response and adjustment time (small masses to be accelerated);
Intelligent wear-compensating readjustment for rear-side pads without additional motor;
Low electrical actuation power (for example approximately 60 W to a maximum of 150 W);
Inexpensive gearwheel pump instead of expensive mechanical heavy-duty gearing;
One electric motor drives, via the gearwheel pump, the brake application, the control unit (valve disc), the readjustment device (pad wear), and the parking brake;
Simple and precise force measurement by use of pressure sensors;
Compact, lightweight design, low sensitivity with respect to vibrations;
Good sliding and lubricating properties of the components as a result of the use of oil;
Robust regulation as a result of being free from play, no mechanical gearwheel pairings for braking force transmission;
For example, a four-stage switching means permits 16 different wedge angles;
Direct measurement of the brake-application force and of the braking force possible;
Precise measurement or detection of the contact point/biting point of the brake pads by differential pressure measurement;
Measurement of the pad wear possible without additional wear travel sensors.

Even though the present invention has been described above on the basis of preferred exemplary embodiments, it is not restricted thereto, but rather may be modified in a variety of ways. The tangential force absorption cylinder 21 may have more or fewer pressure chambers 24 to 26. The control unit 27 may also have magnetic valves instead of or in addition to a control disc.

LIST OF REFERENCE NUMERALS

1 Disc brake
2 Brake disc
3, 3' Brake pad
4 Pad carrier
5 Support device
6 Diverting lever
7 Force transmission unit
8 Thrust portion
9 Brake-application element
10 Brake-application piston
11 Brake-application cylinder
12 Screw spindle
12a Return spring
13 Screw spindle wheel
14 Readjustment pinion
15 Readjustment shaft
16 Readjustment shaft wheel
17 Readjustment drive wheel
18 Emergency release device
19 Gear motor
20 Readjustment device
21 Tangential force absorption cylinder
22 Stepped absorption piston
23 Plunger
23a Thrust plate
23b Readjustment piston
24 First pressure chamber
25 Second pressure chamber
26 Third pressure chamber
27 Control unit
28 Control drive
29 Control transmitter
30 Pump
31 Distributor cylinder
32 Stepped piston
33 Admission pressure chamber
34, 34' High-pressure chamber
35 Inlet pressure chamber
36 Expansion vessel
37 Release valve
38 Switching valve
39 Suction valve
40 Brake caliper
40a Stop element
41 First pressure sensor
42 Second pressure sensor
43 Third pressure sensor
44 Hydraulic switch
45 Slide
46 Reservoir circuit
47 Intermediate circuit
48 Control drive return line
49 Control drive pressure line
50 Pump suction line
51 Pump pressure line
52 Gear motor pressure line
53 Hydraulic switch control line
54 High-pressure line
55 Intermediate lines
56 Connecting lines
57 Brake-application pressure chamber
58 Readjustment chamber
59 Directional valve
60 Shoulder element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A self-energizing disc brake, comprising:
a brake-internal hydraulic arrangement with a reservoir circuit and an expansion vessel;

a brake-application device having at least one brake-application cylinder for the brake-application movement of at least one brake pad in the direction of a brake disc;

at least one force transmission unit which supports the at least one brake pad on the brake-application device at a wedge angle;

at least one tangential force absorption cylinder arrangement for wedge angle switching, which tangential force absorption piston and cylinder arrangement is operatively connected to the at least one force transmission unit;

an electromotive actuator which acts on the brake-application device via the hydraulic arrangement;

a distributor cylinder for pressure boosting, which distributor cylinder is arranged in series between the electromotive actuator and the brake-application device;

a control unit for controlling the wedge angle switching between the tangential force absorption cylinder and the electromotive actuator; and a readjustment device for readjustment to compensate brake pad wear, wherein the readjustment device comprises an adjustable screw spindle, operatively connected to the brake-application device to generating a follow-up movement of the at least one brake pad and drivable by the electromotive actuator, and a readjustment piston, hydraulically adjustable within the piston of the tangential force absorption piston and cylinder arrangement during the during the follow-up movement of the at least one brake pad.

2. The disc brake as claimed in claim 1, wherein a readjustment device further includes a hydraulic gear motor which is hydraulically coupleable to the electromotive actuator via a hydraulic switch, the hydraulic motor including a readjustment drive wheel configured to cooperate with, for each brake-application cylinder of the at least one brake-application cylinder, a readjustment shaft drive wheel coupled to the screw spindle of each brake-application cylinder.

3. The disc brake as claimed in claim 2, wherein
the at least on brake-application cylinder includes two brake-application cylinders,
the readjustment drive wheel is centrally positioned between the two readjustment shaft drive wheels of the adjustable screw spindles of the two brake-application cylinders such that operation of the hydraulic gear motor simultaneously synchronously adjusts the two brake-application cylinders.

4. The disc brake as claimed in claim 2, wherein the hydraulic switch is controllable by the control unit.

5. The disc brake as claimed in claim 1, wherein the readjustment piston is connectable to the reservoir circuit via a directional valve during the follow-up movement.

6. The disc brake as claimed in claim 5, wherein
the readjustment device has at least one readjustment travel sensor configured to detect a readjustment travel and
the at least one readjustment travel sensor is configured to communicate a signal representing the readjustment travel to the brake control unit.

7. The disc brake as claimed in claim 1, wherein
the expansion vessel of the reservoir circuit of the brake-internal hydraulic arrangement includes a pad wear sensor, and
the sensor is connected to a brake control unit coupled at least to the electromotive actuator and to the control unit.

8. The disc brake as claimed in claim 7, wherein
the readjustment device has at least one readjustment travel sensor configured to detect a readjustment travel, and
the at least one readjustment travel sensor is configured to communicate a signal representing the readjustment travel to the brake control unit.

9. The disc brake as claimed in claim 1, wherein
the control unit includes a control drive configured to hydraulically drive a control disc, and
the control drive is configured to be operated by the electromotive actuator via a switching valve.

10. The disc brake as claimed in claim 9, wherein
the readjustment device has at least one readjustment travel sensor configured to detect a readjustment travel, and
the at least one adjustment travel sensor is configured to communicate a signal representing the readjustment travel to the brake control unit.

11. The disc brake as claimed in claim 1, wherein the readjustment device comprises an emergency release device, configured to permit the readjustment drive wheel to rotate in a brake-release direction.

12. The disc brake as claimed in claim 1, wherein the at least one readjustment travel sensor for determining a readjustment travel is a multi-turn potentiometer directly or indirectly coupled to the screw spindle.

\* \* \* \* \*